(12) United States Patent
Ikeda et al.

(10) Patent No.: US 12,208,672 B2
(45) Date of Patent: Jan. 28, 2025

(54) WORK MACHINE

(71) Applicant: Komatsu Ltd., Tokyo (JP)

(72) Inventors: Masahiro Ikeda, Tokyo (JP); Kazuya Imamura, Tokyo (JP); Takaaki Mizokami, Tokyo (JP); Naotsuna Matsuda, Tokyo (JP); Takeshi Nakagawa, Tokyo (JP); Naoya Ando, Tokyo (JP)

(73) Assignee: KOMATSU LTD., Tokyo (JP)

( * ) Notice: Subject to any disclaimer, the term of this patent is extended or adjusted under 35 U.S.C. 154(b) by 308 days.

(21) Appl. No.: 17/777,195

(22) PCT Filed: Oct. 29, 2020

(86) PCT No.: PCT/JP2020/040632
§ 371 (c)(1),
(2) Date: May 16, 2022

(87) PCT Pub. No.: WO2021/100434
PCT Pub. Date: May 27, 2021

(65) Prior Publication Data
US 2022/0410694 A1   Dec. 29, 2022

(30) Foreign Application Priority Data
Nov. 18, 2019   (JP) .................................. 2019-208193

(51) Int. Cl.
*B60K 11/06* (2006.01)
*B60K 13/04* (2006.01)
(Continued)

(52) U.S. Cl.
CPC .............. *B60K 11/06* (2013.01); *B60K 13/04* (2013.01); *B60R 13/0838* (2013.01); *E02F 9/0866* (2013.01)

(58) Field of Classification Search
CPC ...... B60K 11/06; B60K 13/04; B60R 13/0838
See application file for complete search history.

(56) References Cited

U.S. PATENT DOCUMENTS

| 4,071,009 | A | * | 1/1978 | Kraina | ................ | B60R 13/0838 181/204 |
| 4,086,976 | A | * | 5/1978 | Holm | .................. | B60R 13/0838 180/68.1 |
| 7,131,422 | B2 | | 11/2006 | Kimura et al. | | |

(Continued)

FOREIGN PATENT DOCUMENTS

| CN | 103796860 A | 5/2014 |
| DE | 602005002961 T2 | 8/2008 |

(Continued)

OTHER PUBLICATIONS

Office Action dated Jan. 28, 2024, issued for the corresponding KR patent application No. 10-2022-7016399 and English translation thereof.

(Continued)

*Primary Examiner* — Brian L Swenson
(74) *Attorney, Agent, or Firm* — Locke Lord LLP

(57) ABSTRACT

A work machine includes: a partition member provided with an intake port and an exhaust port and forming an engine room; an engine disposed in the engine room; a cooling fan disposed on an intake port side of the engine in the engine room; an exhaust pipe discharging exhaust gas from the engine; and an exhaust duct disposed in the engine room and having an inflow port into which air from the cooling fan flows, and an outflow port. At least a portion of the exhaust duct is disposed above the engine and has a facing surface facing the engine and a through-hole provided in the facing surface. At least a portion of the exhaust pipe is disposed in the through-hole. A gap is formed between an outer surface of the exhaust pipe and an inner surface of the through-hole.

5 Claims, 5 Drawing Sheets

(51) Int. Cl.
  *B60R 13/08* (2006.01)
  *E02F 9/08* (2006.01)

(56) References Cited

U.S. PATENT DOCUMENTS

| | | | |
|---|---|---|---|
| 11,808,008 B2* | 11/2023 | Hayashi | B60K 11/04 |
| 2005/0188926 A1 | 9/2005 | Kimura et al. | |
| 2008/0053312 A1* | 3/2008 | Redmann | B60R 13/0838 |
| | | | 96/380 |
| 2011/0214931 A1* | 9/2011 | Nakashima | E02F 9/08 |
| | | | 180/68.1 |
| 2013/0081887 A1* | 4/2013 | Tsuchihashi | E02F 9/0866 |
| | | | 180/68.1 |
| 2014/0166380 A1 | 6/2014 | Numasawa | |
| 2015/0068470 A1* | 3/2015 | Tsutsumi | B60K 11/06 |
| | | | 123/41.7 |
| 2016/0356018 A1 | 12/2016 | Tabuchi et al. | |

FOREIGN PATENT DOCUMENTS

| | | |
|---|---|---|
| JP | H11-158916 A | 6/1999 |
| JP | H11-254976 A | 9/1999 |
| JP | 2003-201720 A | 7/2003 |
| JP | 2005-282362 A | 10/2005 |
| JP | 2009-275662 A | 11/2009 |
| JP | 2017-2509 A | 1/2017 |

OTHER PUBLICATIONS

Office Action dated May 23, 2024, issued in the corresponding Chinese patent application No. 202080079463.5 and English translation thereof.

Office Action dated Jul. 2, 2024, issued for the corresponding DE patent application No. 11 2020 005 021.1.

\* cited by examiner

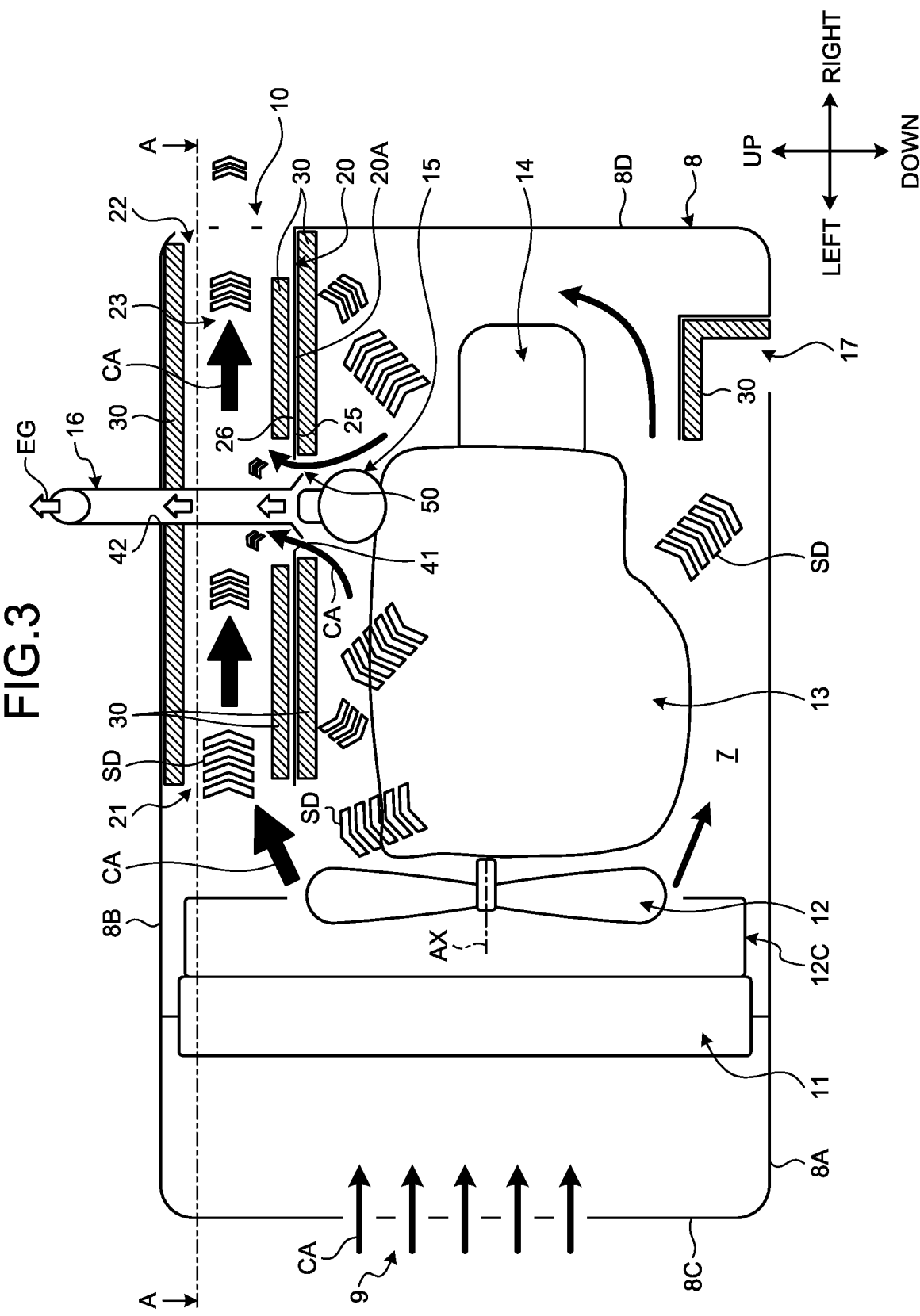

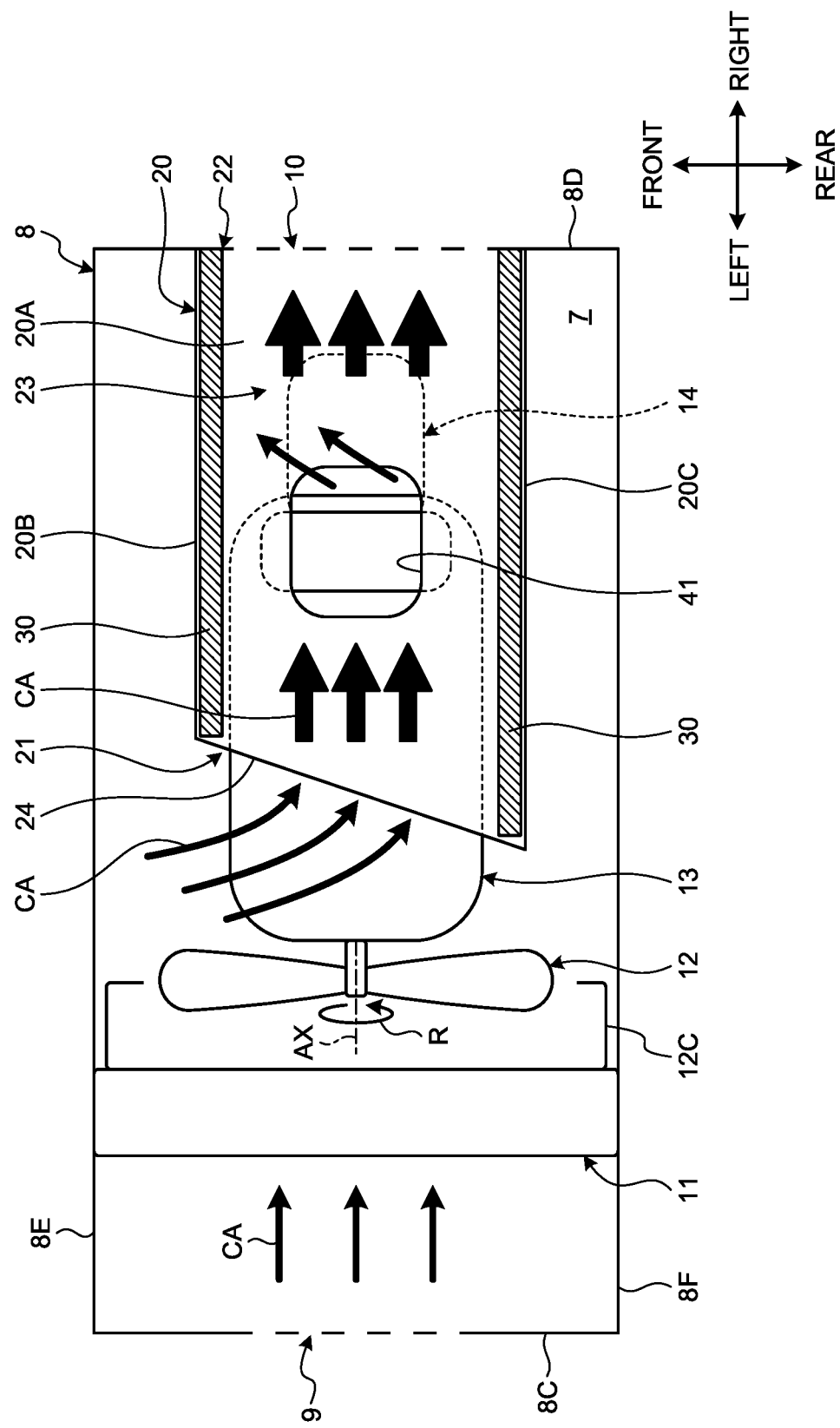

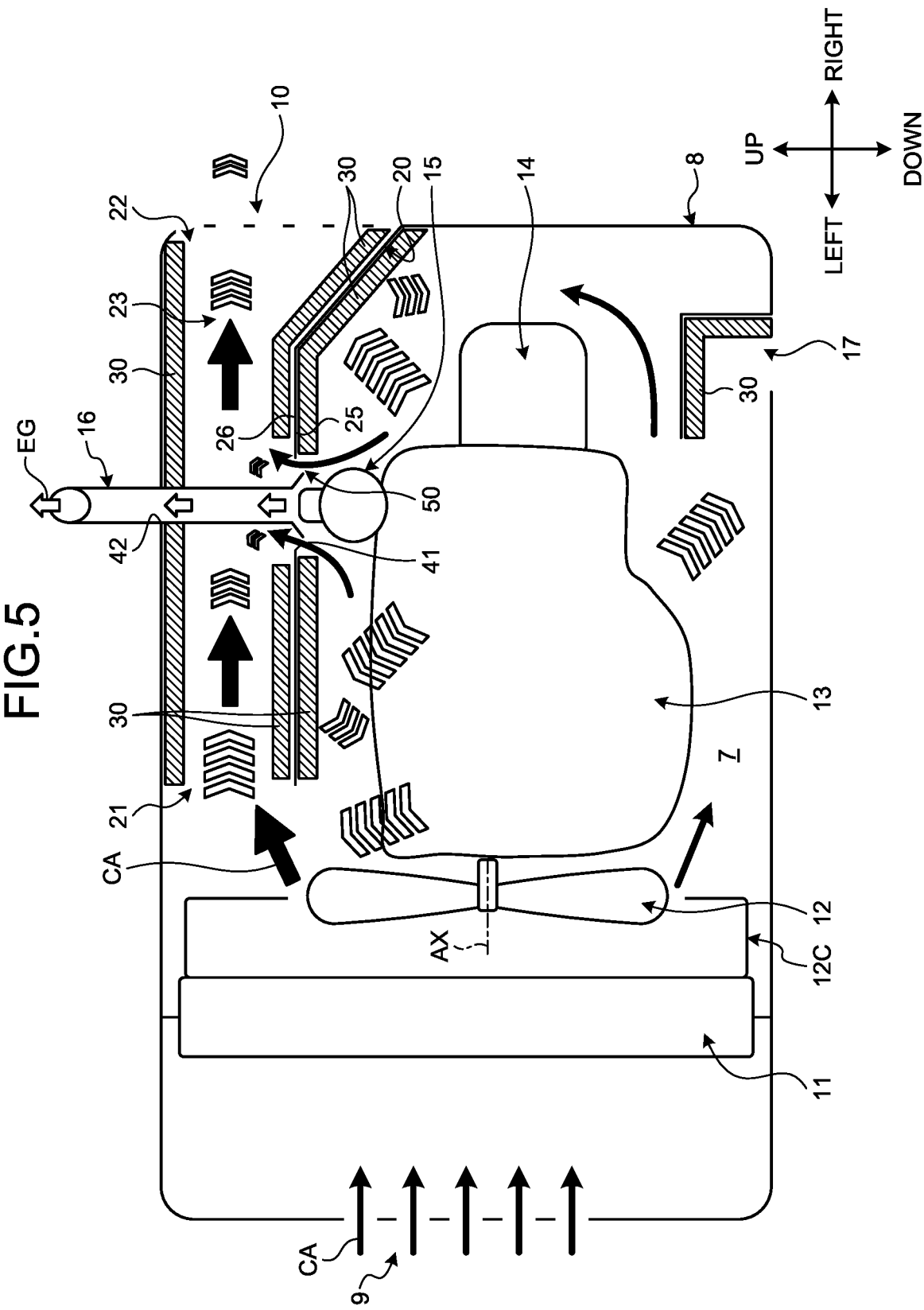

WORK MACHINE

FIELD

The present disclosure relates to a work machine.

BACKGROUND

In the technical field related to a work machine, a construction machine is known which includes a cooling fan and an engine as disclosed in Patent Literature 1.

CITATION LIST

Patent Literature

Patent Literature 1: JP 2005-282362 A

SUMMARY

Technical Problem

Noise is generated from a cooling fan or an engine. What is desired is a technique that can suppress noise around a work machine.

An object of the present disclosure is to suppress noise.

Solution to Problem

According to an aspect of the present invention, a work machine comprises: a partition member provided with an intake port and an exhaust port and forming an engine room; an engine disposed in the engine room; a cooling fan disposed closer to an intake port than the engine in the engine room; an exhaust pipe discharging exhaust gas from the engine; and an exhaust duct disposed in the engine room and having an inflow port into which air from the cooling fan flows, and an outflow port, wherein at least a portion of the exhaust duct is disposed above the engine and has a facing surface facing the engine and a through-hole provided in the facing surface, at least a portion of the exhaust pipe is disposed in the through-hole, and a gap is formed between an outer surface of the exhaust pipe and an inner surface of the through-hole.

Advantageous Effects of Invention

The present disclosure can suppress noise.

BRIEF DESCRIPTION OF DRAWINGS

FIG. 3 is a rear view schematically illustrating the exhaust structure of the work machine according to the first embodiment.

FIG. 4 is a cross-sectional view schematically illustrating the exhaust structure of the work machine according to the first embodiment.

FIG. 5 is a rear view schematically illustrating the exhaust structure of the work machine according to a second embodiment.

DESCRIPTION OF EMBODIMENTS

Embodiments according to the present disclosure will be described below with reference to the drawings, but the present disclosure is not limited thereto. The components of the embodiments described below can be combined as appropriate. In addition, some of the components may not be used.

In the embodiments, the positional relationship of each part will be described using terms such as "left", "right", "front", "rear", "upper", and "lower". These terms indicate relative positions or directions with respect to the center of a work machine 1. As described below, the work machine 1 includes a lower traveling body 2, an upper swing body 3, and a working equipment 4. A direction orthogonal to a ground contact surface of the lower traveling body 2 is defined as an upward and downward direction, a direction parallel to a rotation axis of the working equipment 4 is defined as a left and right direction, and a direction orthogonal to each of the up and down direction and the left and right direction is defined as a front and rear direction. The downward direction is a direction from the ground contact surface of the lower traveling body 2 toward the ground, and the upward direction is a direction opposite to the downward direction. The front direction is a direction from the upper swing body 3 toward the working equipment 4, and the rear direction is a direction opposite to the front direction. The left direction is a left direction when facing the front direction, and the right direction is a direction opposite to the left direction.

First Embodiment

<Work Machine>

Figure 1:
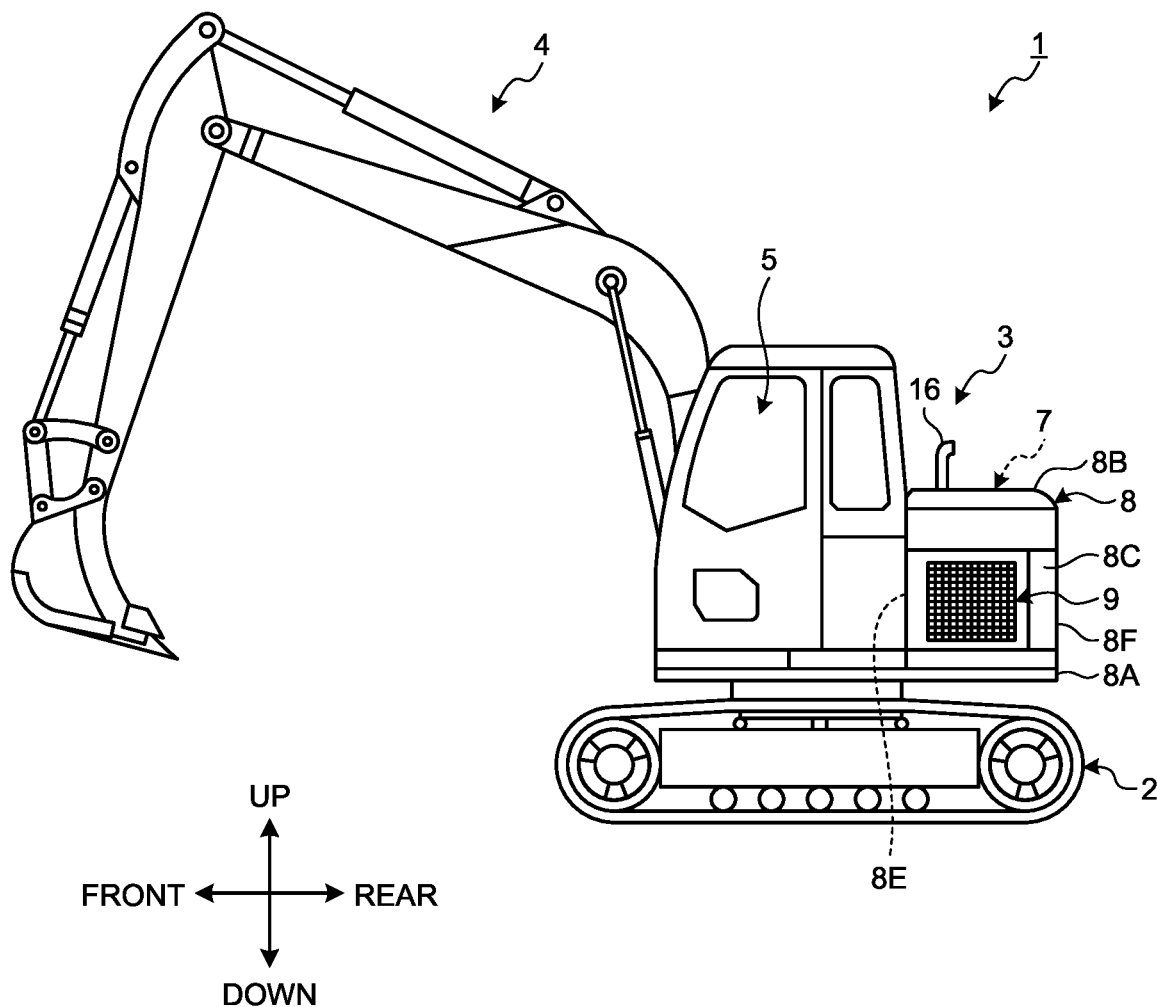
FIG. 1 is a side view schematically illustrating a work machine according to a first embodiment.
Figure 2:
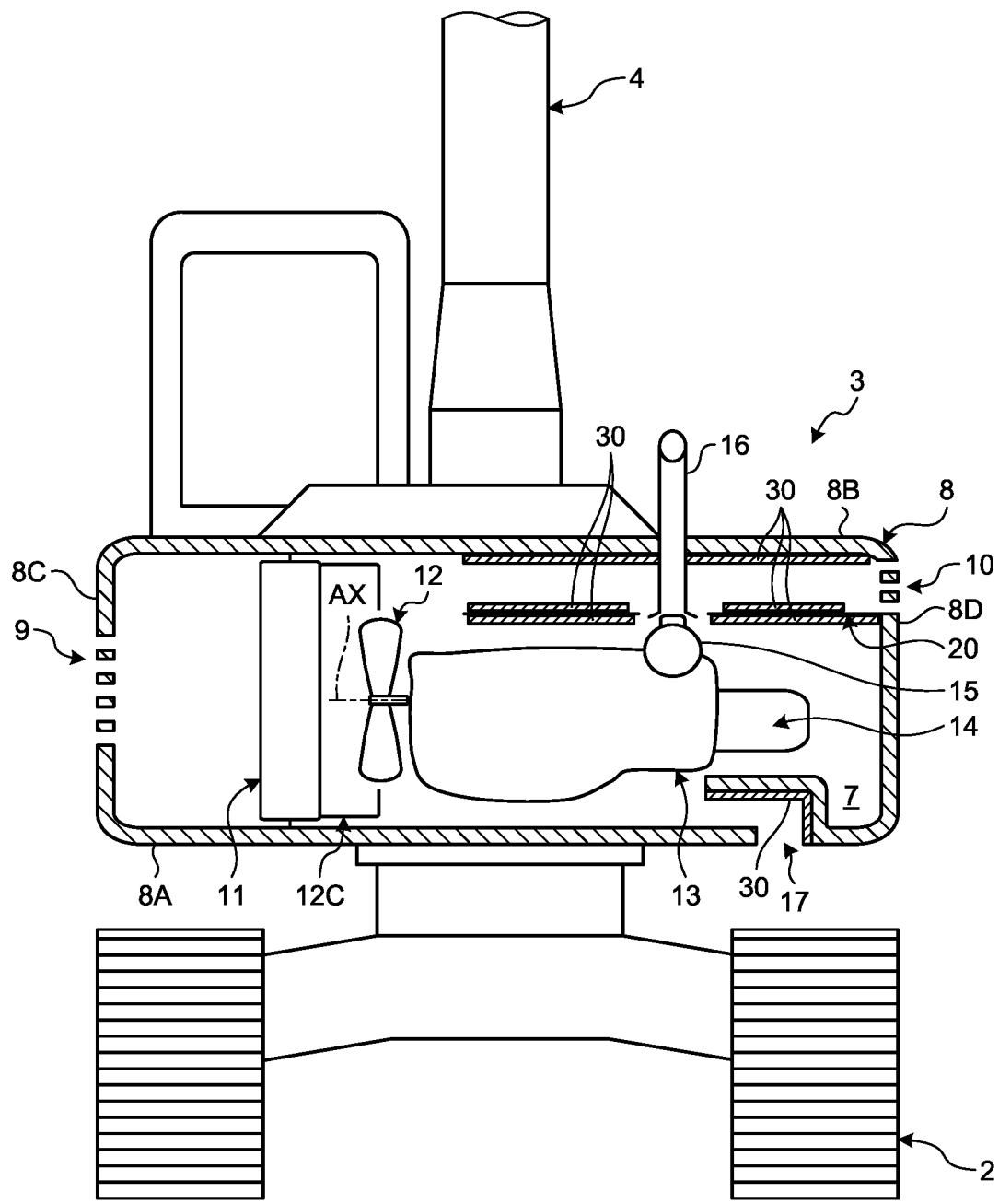
FIG. 2 is a rear view schematically illustrating the work machine according to the first embodiment.

FIG. 1 is a side view schematically illustrating the work machine 1 according to the present embodiment. FIG. 2 is a rear view schematically illustrating the work machine 1 according to the present embodiment. In the present embodiment, it is assumed that the work machine 1 is an excavator.

As illustrated in FIGS. 1 and 2, the work machine 1 includes a lower traveling body 2, an upper swing body 3, and a working equipment 4.

The lower traveling body 2 has a pair of crawlers. When the crawlers rotate, the work machine 1 travels.

The upper swing body 3 has a partition member 8 forming an engine room 7. The engine room 7 is an internal space of the partition member 8. The partition member 8 has a bottom plate portion 8A, a top plate portion 8B, a left wall portion 8C, a right wall portion 8D, a front wall portion 8E, and a rear wall portion 8F. The upper swing body 3 is provided with an operator cab 5.

The partition member 8 is provided with an intake port 9 and an exhaust port 10. The intake port 9 is provided in the left wall portion 8C of the partition member 8. The exhaust port 10 is provided in the right wall portion 8D of the partition member 8. The air CA in the external space of the partition member 8 can flow into the engine room 7 through the intake port 9. The air CA in the engine room 7 can flow out to the external space of the partition member 8 through the exhaust port 10.

In the embodiment, the partition member 8 is provided with a second exhaust port 17. The second exhaust port 17 is provided in the bottom plate portion 8A of the partition member 8. The second exhaust port 17 may be omitted.

As illustrated in FIG. 2, the work machine 1 includes a cooling device 11, a fan shroud 12C, a cooling fan 12, an engine 13, a hydraulic pump 14, an exhaust gas treatment device 15, and an exhaust pipe 16.

Each of the cooling device 11, the fan shroud 12C, the cooling fan 12, the engine 13, the hydraulic pump 14, the exhaust gas treatment device 15, an exhaust duct 20, and a sound absorbing material 30 is disposed in the engine room 7. At least a portion of the exhaust pipe 16 is disposed in the engine room 7. At least a portion of the exhaust pipe 16 is disposed in the external space of the partition member 8.

The cooling device 11 includes a radiator that cools the engine 13. The cooling device 11 is disposed between the intake port 9 and the cooling fan 12 in the engine room 7. The cooling device 11 is disposed so as to face the intake port 9.

The cooling fan 12 is disposed on the intake port 9 side (left side) of the engine 13 in the engine room 7. The cooling fan 12 is disposed closer to the intake port 9 than the engine 13 in the engine room 7 is to the intake port 9. The cooling fan 12 rotates about a rotation axis AX to cause the air CA to flow through the cooling device 11. The cooling fan 12 is an axial fan. The cooling fan 12 is disposed between the cooling device 11 and the engine 13. In the embodiment, at least a portion of the cooling fan 12 is disposed on the right side of the fan shroud 12C. When the cooling fan 12 rotates, the air CA in the external space of the partition member 8 flows into the engine room 7 through the intake port 9. The air CA flowing into the engine room 7 passes through the cooling device 11, and then flows into the cooling fan 12 through the fan shroud 12C.

The fan shroud 12C is disposed on the right side of the cooling device 11. The fan shroud 12C is connected to the cooling device 11. At least a portion of the fan shroud 12C is disposed between the cooling device 11 and the cooling fan 12. At least a portion of the fan shroud 12C is disposed around the cooling fan 12. When the cooling fan 12 rotates, only the air CA passing through the cooling device 11 flows into the cooling fan 12 through the fan shroud 12C. The fan shroud 12C adjusts the flow of the air CA between the cooling device 11 and the cooling fan 12. The fan shroud 12C suppresses a decrease in cooling capability of the cooling device 11.

The engine 13 is a power source of the work machine 1. Examples of the engine 13 include a diesel engine. The engine 13 is disposed in the engine room 7.

The hydraulic pump 14 discharges hydraulic oil. The hydraulic pump 14 is disposed on the exhaust port 10 side (right side) of the engine 13 in the engine room 7. The hydraulic pump 14 is connected to the engine 13. When the engine 13 is driven, the hydraulic pump 14 is driven. At least a portion of the hydraulic oil discharged from the hydraulic pump 14 is supplied to a hydraulic cylinder for driving the working equipment 4.

The exhaust gas treatment device 15 treats exhaust gas EG from the engine 13. The exhaust gas treatment device 15 includes, for example, a diesel oxidation catalyst (DOC) and a diesel particulate filter (DPF) that treat the exhaust gas EG using a catalyst.

The exhaust gas EG from the engine 13 is treated by the exhaust gas treatment device 15, and then discharged from the exhaust pipe 16. The exhaust pipe 16 extends upward from the engine 13. A lower end portion of the exhaust pipe 16 is disposed in the engine room 7. An upper end portion of the exhaust pipe 16 is disposed in an external space of the partition member 8.

<Exhaust Structure>

FIG. 3 is a rear view schematically illustrating the exhaust structure of the work machine 1 according to the present embodiment. FIG. 4 is a cross-sectional view schematically illustrating the exhaust structure of the work machine 1 according to the present embodiment, and corresponds to a cross-sectional view taken along the line A-A in FIG. 3.

As illustrated in FIGS. 2, 3, and 4, the exhaust structure of the work machine 1 includes the exhaust duct 20 and the sound absorbing material 30.

The exhaust duct 20 is disposed in the engine room 7. The exhaust duct 20 has an inflow port 21 into which the air CA from the cooling fan 12 flows, an outflow port 22 connected to the exhaust port 10, and a flow path 23 connecting the inflow port 21 and the outflow port 22.

At least a portion of the exhaust duct 20 is disposed above the engine 13. At least a portion of the exhaust duct 20 is also disposed above the hydraulic pump 14. Being disposed above the engine 13 is a concept that includes not only being disposed directly above the engine 13 but also being disposed obliquely above the engine 13.

The exhaust duct 20 is disposed so as to face the inner surface of the top plate portion 8B. In the present embodiment, the exhaust duct 20 has a lower plate portion 20A, a front plate portion 20B, and a rear plate portion 20C. A lower surface of the lower plate portion 20A is disposed above the engine 13 and faces the engine 13. A front end portion of the lower plate portion 20A is connected to a lower end portion of the front plate portion 20B. A rear end portion of the lower plate portion 20A is connected to a lower end portion of the rear plate portion 20C. Each of an upper end portion of the front plate portion 20B and an upper end portion of the rear plate portion 20C is connected to an inner surface of the top plate portion 8B. The exhaust duct 20 is preferably a closed space from the upstream side to the downstream side such that sound SD generated from the engine 13 and others is reduced.

The inner surface of the exhaust duct 20 may be a flat surface from the upstream side to the downstream side or may be an uneven surface.

The inflow port 21 is disposed above the engine 13 and on the exhaust port 10 side (right side) of the cooling fan 12. The inflow port 21 is disposed closer to the exhaust port 10 than the cooling fan 12 is to the exhaust port 10. When the cooling fan 12 rotates, an airflow is generated in the engine room 7. At least a portion of the air CA from the cooling fan 12 flows into the inflow port 21.

The flow path 23 is provided so as to connect the inflow port 21 and the outflow port 22. In the present embodiment, the flow path 23 is defined by the exhaust duct 20 and the top plate portion 8B. The flow path 23 is defined by an upper surface of the lower plate portion 20A, a rear surface of the front plate portion 20B, a front surface of the rear plate portion 20C, and a lower surface of the top plate portion 8B. Each of the upper surface of the lower plate portion 20A, the rear surface of the front plate portion 20B, the front surface of the rear plate portion 20C, and the lower surface of the top plate portion 8B is a flow path surface facing the flow path 23 of the exhaust duct 20.

The exhaust duct 20 may have a cylindrical shape. The exhaust duct 20 may have a cylindrical shape, for example.

The outflow port 22 is connected to the exhaust port 10. The air CA flowing into the flow path 23 through the inflow port 21 and flowing through the flow path 23 flows out through the outflow port 22. The air CA flowing out from the outflow port 22 is discharged to the external space of the partition member 8 through the exhaust port 10.

The exhaust port 10 is connected to the outflow port 22 of the exhaust duct 20.

The exhaust duct 20 has a lower surface 25 (facing surface) facing the engine 13, and a first hole 41 which is a through-hole provided in the lower surface 25. The lower surface 25 of the exhaust duct 20 is a lower surface of the lower plate portion 20A. The first hole 41 penetrates the lower surface 25 of the lower plate portion 20A and an upper surface 26 (flow path surface) of the lower plate portion 20A. At least a portion of the exhaust pipe 16 is disposed in the first hole 41. The lower end portion of the exhaust pipe 16 is disposed below the first hole 41.

In the present embodiment, a gap 50 is formed between the outer surface of the exhaust pipe 16 and the inner surface of the first hole 41. In the present embodiment, the inner diameter of the first hole 41 is larger than the outer diameter of the exhaust pipe 16. The air CA can flow through the gap 50.

The partition member 8 has a second hole 42 penetrating the lower surface and the upper surface of the top plate portion 8B. The lower surface of the top plate portion 8B is the inner surface of the partition member 8 that faces the engine room 7. The upper surface of the top plate portion 8B is the outer surface of the partition member 8 that faces the external space of the partition member 8. At least a portion of the exhaust pipe 16 is disposed in the second hole 42. The upper end portion of the exhaust pipe 16 is disposed above the second hole 42.

In the present embodiment, the outer surface of the exhaust pipe 16 is connected to the inner surface of the second hole 42. No gap is formed between the outer surface of the exhaust pipe 16 and the inner surface of the second hole 42. A gap may not be formed by bringing the outer surface of the exhaust pipe 16 and the inner surface of the second hole 42 into close contact with each other. A gap may not be formed by disposing a seal member between the outer surface of the exhaust pipe 16 and the inner surface of the second hole 42. The air CA cannot flow between the outer surface of the exhaust pipe 16 and the inner surface of the second hole 42.

As illustrated in FIG. 4, an end surface 24 of the exhaust duct 20 defining the inflow port 21 is inclined with respect to the rotation axis AX of the cooling fan 12. The end surface 24 is inclined based on the flow of air from the cooling fan 12. In the present embodiment, the rotation axis AX extends in the left and right direction. The end surface 24 is inclined to the exhaust port 10 side (right side) toward the front side.

The cooling fan 12 has a predefined shape and rotates in a predefined direction such that the air CA in the external space of the partition member 8 flows into the engine room 7 through the intake port 9. In the present embodiment, the cooling fan 12 rotates in a direction indicated by an arrow R in FIG. 4.

The inflow port 21 is disposed above the cooling fan 12 and the engine 13 and on the exhaust port 10 side of the cooling fan 12. When the cooling fan 12 rotates in the direction indicated by the arrow R, the air CA from the cooling fan 12 flows into the inflow port 21 exclusively from the front side. In other words, in the present embodiment, the cooling fan 12 rotates such that the air CA flows into the inflow port 21 from the front side of the inflow port 21. In the present embodiment, the end surface 24 is inclined to the exhaust port 10 side (right side) toward the front side. Thus, the air CA from the cooling fan 12 can smoothly flow into the inflow port 21.

If the cooling fan 12 rotates such that air flows into the inflow port 21 from the rear side, the end surface 24 of the exhaust duct 20 is preferably inclined to the exhaust port 10 side (right side) toward the rear side.

The sound absorbing material 30 is disposed in at least a portion of the exhaust duct 20. The sound absorbing material 30 is disposed so as to face at least the flow path 23. The sound absorbing material 30 is disposed on at least a portion of the upper surface of the lower plate portion 20A, the rear surface of the front plate portion 20B, and the front surface of the rear plate portion 20C. In the present embodiment, as illustrated in FIGS. 3 and 4, the sound absorbing material is disposed on each of the upper surface of the lower plate portion 20A, the lower surface of the lower plate portion 20A, the rear surface of the front plate portion 20B, the front surface of the rear plate portion 20C, and the lower surface of the top plate portion 8B.

The sound absorbing material 30 is a member capable of absorbing sound. Examples of the sound absorbing material 30 include a porous member. Examples of the porous member include urethane foam and sponge. The sound absorbing material 30 may be a nonwoven fabric.

[Operation]

An operation of the work machine 1 according to the present embodiment will now be described. When the engine 13 is driven, the cooling fan 12 is rotated and the hydraulic pump 14 is driven. When the cooling fan 12 rotates, the air CA in the external space of the partition member 8 flows into the engine room 7 through the intake port 9. The air CA flowing into the engine room 7 passes through the cooling device 11, and then flows into the cooling fan 12.

At least a portion of the air CA passing through the cooling fan 12 is supplied around the engine 13 and around the hydraulic pump 14. Each of the engine 13 and the hydraulic pump 14 is cooled by contact with the air CA.

In the present embodiment, the exhaust port 10 is connected to the outflow port 22 of the exhaust duct 20. At least a portion of the air CA flowing into the engine room 7 and passing through the cooling fan 12 flows into the flow path 23 of the exhaust duct 20 through the inflow port 21 of the exhaust duct 20.

In the present embodiment, the end surface 24 of the exhaust duct 20 is inclined in accordance with the flow direction of the air CA caused by the rotation of the cooling fan 12. Therefore, the air CA from the cooling fan 12 smoothly flows into the flow path 23 through the inflow port 21.

The air CA flowing into the flow path 23 of the exhaust duct 20 from the inflow port 21 flows through the flow path 23, and then is discharged to the external space of the partition member 8 through the outflow port 22 and the exhaust port 10.

At least a portion of the air CA passing through the cooling fan 12 is supplied around the exhaust gas treatment device 15. The exhaust gas treatment device 15 is cooled by contact with the air CA.

The exhaust gas treatment device 15 and the lower end portion of the exhaust pipe 16 are disposed below the first hole 41. In other words, in the engine room 7, the exhaust gas treatment device 15 and the lower end portion of the exhaust pipe 16 are disposed in a space outside the flow path 23. In the present embodiment, the gap 50 is formed between the outer surface of the exhaust pipe 16 and the inner surface of the first hole 41. The air CA around the exhaust gas treatment device 15 and the air CA around the lower end portion of the exhaust pipe 16 flow into the flow path 23 of the exhaust duct 20 through the gap 50. The air CA flowing through the flow path 23 from the inflow port 21 toward the outflow port 22 causes a pressure difference between the flow path 23, and the space around the exhaust gas treatment device 15 and the space around the lower end portion of the exhaust pipe 16. The pressure in the flow path 23 is lower than the pressure in the space around the exhaust gas treatment device 15 and the pressure in the space around the lower end portion of the exhaust pipe 16. The generation of the pressure difference allows the air CA around the exhaust gas treatment device 15 and the air CA around the lower end portion of the exhaust pipe 16 to smoothly flow into the flow path 23 of the exhaust duct 20 through the gap 50.

As described above, the air CA flowing into the exhaust duct 20 from the cooling fan 12 through the inflow port 21 and the air CA flowing into the exhaust duct 20 from around the engine 13 through the gap 50 flow out through the outflow port 22. In other words, the air CA warmed by passing through the cooling device 11 flows into the flow path 23 from the inflow port 21. The air CA warmed by passing around the engine 13, around the hydraulic pump 14, and around the exhaust gas treatment device 15 flows into the flow path 23 from the gap 50. The warmed air CA flows through the flow path 23, and then is discharged to the external space of the partition member 8 through the outflow port 22 and the exhaust port 10. When the warmed air CA is discharged to the external space of the partition member 8, the temperature rise of the engine room 7 is suppressed. If an electronic device is present in the engine room 7, the temperature rise of the engine room 7 is suppressed, so that the failure or deterioration of the electronic device is suppressed. Examples of the electronic device present in the engine room 7 include a sensor for monitoring the state of the engine 13.

The sound SD is generated from at least one of the cooling fan 12 and the engine 13. In the present embodiment, the cooling fan 12 and the engine 13 are disposed outside the exhaust duct 20 in the engine room 7. In the engine room 7, a partial space in which the cooling fan 12 and the engine 13 are disposed is not connected to the external space of the partition member 8. Therefore, even if the sound SD is generated from the cooling fan 12 or the engine 13, the sound SD generated from the cooling fan 12 or the engine 13 is prevented from leaking to the external space of the partition member 8.

At least a portion of the sound SD generated from at least one of the cooling fan 12 and the engine 13 propagates through the flow path 23 of the exhaust duct 20. The sound SD propagates while hitting the flow path surface of the exhaust duct 20. The sound SD is attenuated by hitting the flow path surface of the exhaust duct 20. In other words, the sound SD is attenuated by the time the sound reaches the outflow port 22 and the exhaust port 10. Therefore, the sound SD leaking from the exhaust port 10 to the external space of the partition member 8 is small.

In the present embodiment, the sound absorbing material 30 is disposed in the exhaust duct 20. Therefore, the sound SD propagating through the flow path 23 of the exhaust duct 20 is sufficiently attenuated by the time the sound reaches the outflow port 22 and the exhaust port 10.

No gap is formed between the outer surface of the exhaust pipe 16 and the inner surface of the second hole 42. Therefore, the sound SD is prevented from leaking to the external space of the partition member 8 from between the outer surface of the exhaust pipe 16 and the inner surface of the second hole 42.

[Effects]

As described above, according to the present embodiment, since the exhaust duct 20 is provided in the engine room 7, the air CA warmed in the engine room 7 is smoothly discharged to the external space of the partition member 8 through the exhaust duct 20. Therefore, the temperature rise of the engine room 7 is suppressed.

The sound SD generated from the cooling fan 12 or the engine 13 hits the flow path surface of the exhaust duct 20 when propagating through the flow path 23 of the exhaust duct 20. Therefore, the sound SD is sufficiently attenuated by the time the sound reaches the outflow port 22 and the exhaust port 10. In other words, the sound SD leaking from the exhaust port 10 to the external space of the partition member 8 is small. Therefore, generation of noise is suppressed.

In the present embodiment, at least a portion of the exhaust duct 20 is disposed above the engine 13, and a sufficient length of the exhaust duct 20 is ensured. Therefore, the sound SD is sufficiently attenuated by the time the sound reaches the exhaust port 10.

In the present embodiment, the exhaust duct 20 has a first hole 41 (through-hole) that penetrates the lower surface 25 (facing surface) facing the engine 13 and the upper surface 26 (flow path surface) facing the flow path 23. The engine 13 and the exhaust gas treatment device 15 are disposed in a space in which the lower surface of the exhaust duct 20 faces (a space below the exhaust duct 20). The gap 50 is formed between the outer surface of the exhaust pipe 16 and the inner surface of the first hole 41. The air CA warmed by contact with the engine 13 and the exhaust gas treatment device 15 can flow into the flow path 23 through the gap 50. Therefore, the air CA warmed by contact with the engine 13 and the exhaust gas treatment device 15 is smoothly discharged to the external space of the partition member 8 through the exhaust duct 20.

The upper end portion of the exhaust pipe 16 is disposed in the external space of the partition member 8. Therefore, the exhaust gas EG from the engine 13 is smoothly discharged to the external space of the partition member 8. The partition member 8 has a second hole 42 penetrating the inner surface and the outer surface of the partition member 8. At least a portion of the exhaust pipe 16 is disposed in the second hole 42. The outer surface of the exhaust pipe 16 is connected to the inner surface of the second hole 42. Since a gap is not formed between the outer surface of the exhaust pipe 16 and the inner surface of the second hole 42, the sound SD is prevented from leaking to the external space of the partition member 8 from between the outer surface of the exhaust pipe 16 and the inner surface of the second hole 42.

The inflow port 21 of the exhaust duct 20 is disposed above the engine 13 and on the exhaust port 10 side of the cooling fan 12. Therefore, the air CA passing through the cooling fan 12 can smoothly flow into the inflow port 21.

The cooling fan 12 rotates such that the air CA flows into the inflow port 21 from one side in the front and rear direction. The end surface 24 of the exhaust duct 20 disposed around the inflow port 21 is inclined to the exhaust port 10 side toward one side in the front and rear direction. Therefore, the air CA passing through the cooling fan 12 can smoothly flow into the inflow port 21.

The sound absorbing material 30 is disposed in at least a portion of the exhaust duct 20. Therefore, the sound SD propagating through the flow path 23 of the exhaust duct 20 is sufficiently attenuated by the time the sound reaches the outflow port 22 and the exhaust port 10.

Second Embodiment

A second embodiment will be described. Components that are the same as or equivalent to those of the above-described embodiments are denoted by the same reference numerals, and description thereof is simplified or omitted.

FIG. 5 is a rear view schematically illustrating the exhaust structure of the work machine 1 according to the present embodiment. As illustrated in FIG. 5, in the present embodiment, the outflow port 22 is larger than the inflow port 21.

The flow path surface of the lower plate portion 20A is inclined downward toward the outflow port 22.

According to the present embodiment, the area of the flow path surface which the sound SD propagating through the flow path 23 hits is increased. Therefore, the sound SD is sufficiently attenuated by the time the sound reaches the outflow port 22 and the exhaust port 10.

Other Embodiments

In the above-described embodiment, the sound absorbing material 30 may not be provided.

In the above-described embodiment, the rotation axis AX of the cooling fan 12 and the end surface 24 of the exhaust duct 20 may be orthogonal to each other.

In the above-described embodiment, the inflow port 21 may be disposed above the cooling fan 12.

In the above-described embodiment, the relative positions of the intake port 9, the cooling device 11, the fan shroud 12C, the cooling fan 12, the engine 13, the hydraulic pump 14, the exhaust duct 20, and the exhaust port 10 can be arbitrarily set. In the above-described embodiment, it has been assumed that the air CA flows from left to right in the engine room 7 by driving the cooling fan 12. The air CA may flow from right to left.

In the above-described embodiment, it has been assumed that the work machine 1 includes the exhaust gas treatment device 15. The exhaust gas treatment device 15 may be omitted.

In the above-described embodiment, it has been assumed that the work machine 1 is an excavator. Examples of the excavator include a small-sized excavator with a small swing type. A small-sized excavator with a small swing type is used for construction of a narrow alley or others. Even in a case where it is difficult to increase the size of the engine room 7 as in a small-sized excavator with a small swing type, noise can be reduced by the components described in the above-described embodiment.

In the above-described embodiment, it has been assumed that the work machine 1 is an excavator. The work machine 1 may be, for example, a bulldozer, a wheel loader, or a forklift. The work machine 1 only needs to include a working equipment.

REFERENCE SIGNS LIST

1 WORK MACHINE
2 LOWER TRAVELING BODY
3 UPPER SWING BODY
4 WORKING EQUIPMENT
5 OPERATOR CAB
7 ENGINE ROOM
8 PARTITION MEMBER
8A BOTTOM PLATE PORTION
8B TOP PLATE PORTION
8C LEFT WALL PORTION
8D RIGHT WALL PORTION
8E FRONT WALL PORTION
8F REAR WALL PORTION
9 INTAKE PORT
10 EXHAUST PORT
11 COOLING DEVICE
12C FAN SHROUD
12 COOLING FAN
13 ENGINE
14 HYDRAULIC PUMP
15 EXHAUST GAS TREATMENT DEVICE
16 EXHAUST PIPE
17 SECOND EXHAUST PORT
20 EXHAUST DUCT
20A LOWER PLATE PORTION
20B FRONT PLATE PORTION
20C REAR PLATE PORTION
21 INFLOW PORT
22 OUTFLOW PORT
23 FLOW PATH
24 END SURFACE
25 LOWER SURFACE (FACING SURFACE)
26 UPPER SURFACE (FLOW PATH SURFACE)
30 SOUND ABSORBING MATERIAL
41 FIRST HOLE (THROUGH-HOLE)
42 SECOND HOLE
50 GAP
AX ROTATION AXIS
CA AIR
EG EXHAUST GAS
SD SOUND

The invention claimed is:

1. A work machine comprising:
a partition member provided with an intake port and an exhaust port and forming an engine room;
an engine disposed in the engine room;
a cooling fan disposed closer to an intake port than the engine in the engine room is to the intake port;
an exhaust pipe discharging exhaust gas from the engine; and
an exhaust duct disposed in the engine room and having an inflow port into which air from the cooling fan flows, and an outflow port, wherein
at least a portion of the exhaust duct is disposed above the engine and has a facing surface facing the engine and a through-hole provided in the facing surface,
at least a portion of the exhaust pipe is disposed in the through-hole, and a gap is formed between an outer surface of the exhaust pipe and an inner surface of the through-hole, wherein
the exhaust duct has an end surface defining the inflow port, and
the end surface is inclined based on a flow of air from the cooling fan, wherein the end surface is inclined to the exhaust port side toward a front side of the work machine.

2. The work machine according to claim 1, wherein air flowing into the exhaust duct from the cooling fan through the inflow port and air flowing into the exhaust duct from around the engine through the gap flow out through the outflow port.

3. The work machine according to claim 1, wherein the inflow port is disposed closer to an exhaust port than the cooling fan is to the exhaust port.

4. The work machine according to claim 1, wherein the outflow port is larger than the inflow port.

5. The work machine according to claim 1, further comprising:
a sound absorbing material disposed in at least a portion of the exhaust duct.

* * * * *